Jan. 24, 1961

H. O. MONSON 2,969,312

TYPE FUEL ELEMENT

Filed March 14, 1958

INVENTOR.
Harry O. Monson
BY
Roland G. Anderson
Attorney

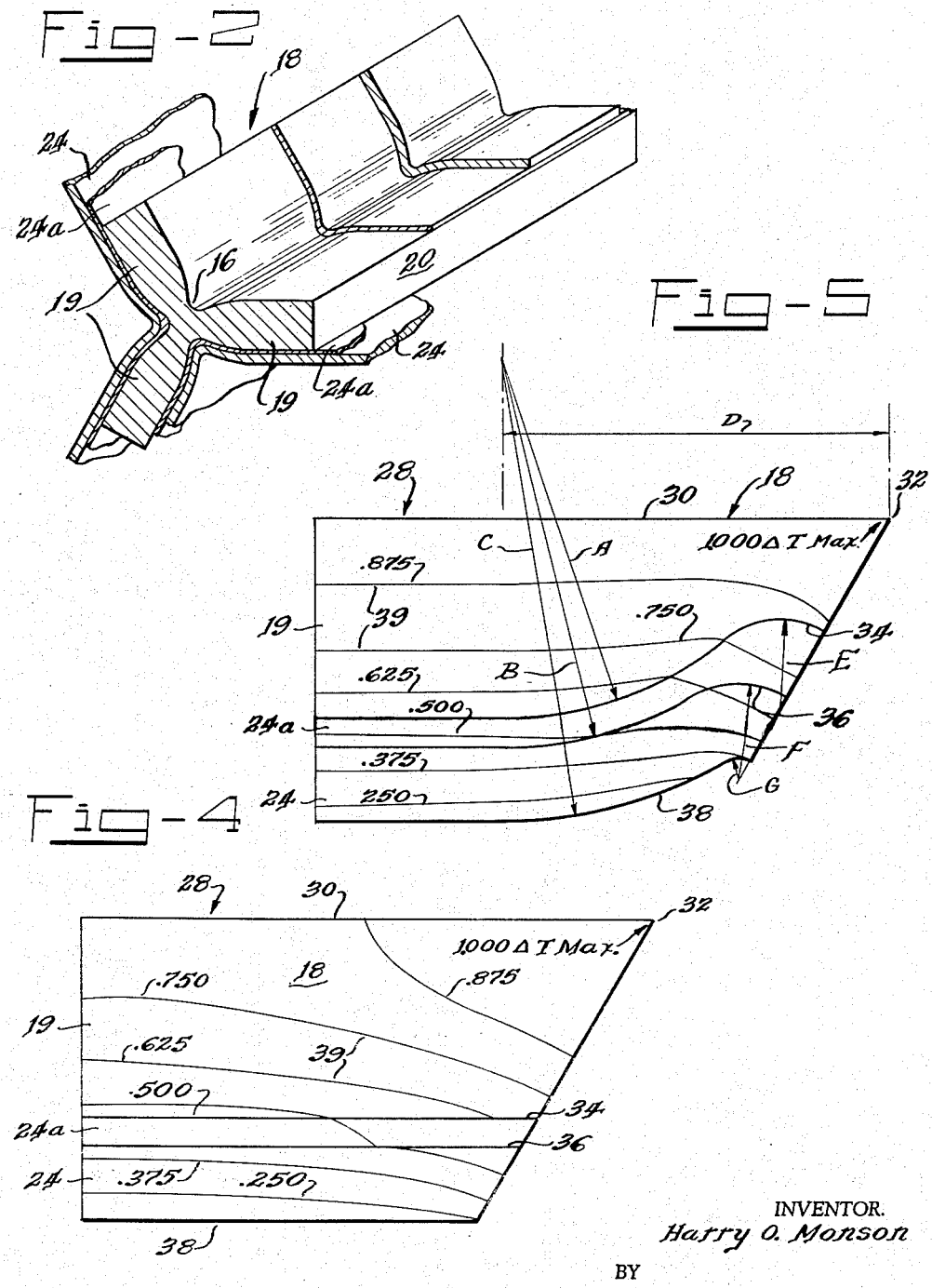

Jan. 24, 1961  H. O. MONSON  2,969,312
TYPE FUEL ELEMENT

Filed March 14, 1958  3 Sheets-Sheet 3

INVENTOR.
Harry O. Monson
BY
Roland G. Anderson
Attorney

United States Patent Office 2,969,312
Patented Jan. 24, 1961

2,969,312
TYPE FUEL ELEMENT

Harry O. Monson, Elmhurst, Ill., assignor to the United States of America as represented by the United States Atomic Energy Commission Filed Mar. 14, 1958, Ser. No. 721,611

6 Claims. (Cl. 204—193.2)

This invention relates to fuel elements for nuclear reactors and more particularly to fuel elements for power producing breeder reactors of the type disclosed in the inventor's copending application, Serial No. 697,295, filed November 18, 1957.

Fast neutron reactors are advantageously useful as power producing fuel breeders because of their efficient use of fission neutrons. The nonfission capture of neutrons in the fuel material is greatly reduced because of their high energy. Also fewer neutrons are absorbed in poison materials contained in structural members and fission products present in the core. Consequently more neutrons are available for breeding and higher conversion ratios are possible.

Due to the absence of moderator materials the volume of the core of a fast reactor is usually smaller than found in thermal neutron reactors. The heat transfer area is consequently greatly reduced and the removal of large amounts of generated heat is a difficult problem. The use of materials having high heat conductivities such as liquid metals facilitates the extraction of large amounts of heat from the small core volume.

Other design factors must be considered, however, for optimum power level operation. The fuel elements wherein the fissioning occurs to release the energy must be designed for optimum heat removal. To obtain maximum power, the reactor must be operated at the highest temperature possible consistent with the structural integrity of the reactor core. That is, the operating level of the reactor is limited by the temperature of the hottest portions within the fuel elements in the core.

The hottest temperatures generally occur in spots located in the fuel element which are farthest removed from the heat transfer surfaces between the fuel elements and the flowing coolant. In a cylindrically shaped fuel pin such as used in the fast neutron reactor of the above-referenced application, the hot spots are found along the axis of the pin. It can be assumed that the heat is generated substantially uniformly throughout the volume of the pin; however, the fuel near the outer portion is maintained at a substantially lower temperature because of its closer proximity to the heat transfer surface. The reactor must be operated at a power level so that the center of the fuel pin is not raised to a temperature level at which detrimental thermal effects would occur.

It will be noted that the average temperature over the total volume of the fuel element is substantially lower than the maximum temperature at the center thereof. A substantial increase of operating power could be obtained if the average temperature could be increased to approach more closely the maximum temperature at the center while maintaining the maximum temperature below its destructive level.

Improving the thermal capabilities of fuel elements for fast neutron reactors results in somewhat complex shapes which may be difficult to fabricate. In breeder type reactors where recycling of the fuel elements is an important facet of operation, the complexities of the fuel element shape must be considered. As described in the aforementioned copending application, the fuel recycling must be handled by remote control equipment to avoid the radiation hazards caused by the radioactive fission products contained in the irradiated fuel. The fuel elements must be capable of being fabricated by the simplest procedures possible so that they may be handled by remote control. A fuel element of the radiator type made up of a plurality of similarly shaped members which may be cast by simple procedures are best suited for reactors of this type.

It is therefore an object of this invention to provide a fuel element for a power producing nuclear reactor which will enable the reactor to operate at a higher output level without adding to the fuel material content in the active core.

It is an object of this invention to provide a nuclear reactor fuel element in which the average temperature throughout the element more closely approaches the maximum temperature of the hottest portions therein.

It is also an object of this invention to provide fuel elements for a power producing nuclear reactor which will enable it to operate at maximum temperature, but which will be capable of being easily fabricated by remote control equipment and procedures.

Other objects and advantages of this invention will become apparent with a further study of the specification as follows, especially when read in view of the attached drawings in which:

Fig. 2 is an isometric view of one of the longitudinal members making up the radiator block;

Fig. 4 is an enlarged sectional view of the crosshatched portion of Fig. 3 indicating the isothermal lines when the corners of the channels and tubes are not enlarged and rounded;

Fig. 5 is an enlarged sectional view of the crosshatched portion of Fig. 3 indicating the isothermal lines when the corners of the channels and tubes are enlarged and rounded.

The objects and advantages of this invention are best achieved in a nuclear reactor radiator type fuel assembly comprising a polygonal shaped cylinder of neutron fissionable material which defines a plurality of longitudinal coolant channels arranged in a geometric lattice in said cylinder. The coolant channels may be shaped so that the maximum temperature isothermal lines approach a straight line equidistant between adjacent coolant channels and said channels may also have coolant containing tubes concentrically disposed therein and thermally bonded to said cylinder. The cylinder is shaped around its periphery to conform concentrically with the combined cross section of the outermost coolant channels. The cylinder comprises a plurality of longitudinal members formed by planes parallel to the faces of the polygonal cylinder, each plane containing the axes of a row of channels parallel to one of the faces.

Figure 1:
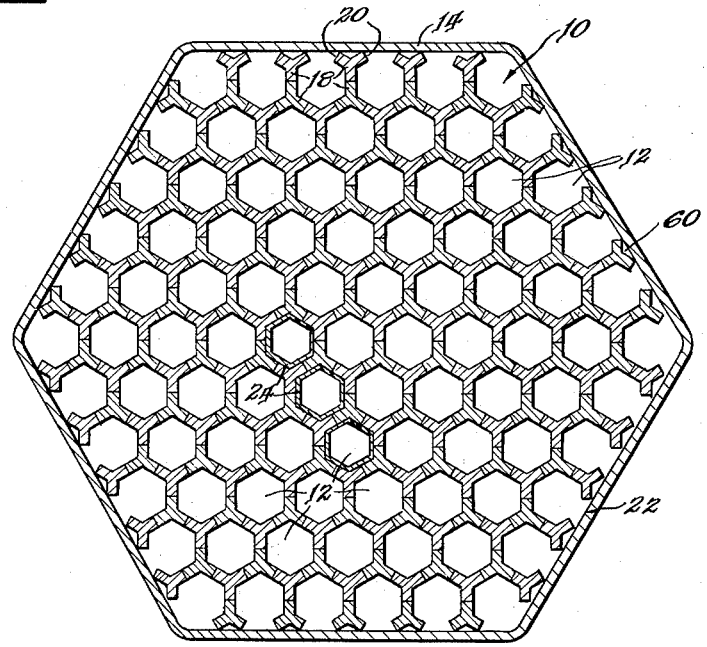
Fig. 1 is a sectional view of a fuel element of the type described showing the lattice arrangement of the coolant channels therein and the arrangement of the longitudinal members making up the radiator type block.

The fuel element or block 10 as shown in Fig. 1 is designed to replace the fuel section of the fuel assemblies disclosed in the copending application of the inventor. The fuel section of the reactor, as originally disclosed, comprises 91 fuel elements composed of a fissium alloy which approaches the equilibrium alloy of infinite recycle. This alloy as well as other fissium alloys suitable for use in this fuel block are disclosed in the referenced copending application. The fuel block 10 of Fig. 1 is essentially a hexagonal cylinder of fissium alloy with a number of triangularly latticed channels 12 longitudinally disposed therethrough. The fuel block 10 is housed within a hexagonal tube 14 which forms the outer sheath of the fuel subassembly of the disclosed reactor. The channels 12 are essentially hexagonally shaped except that the corners 16 are enlarged and specially shaped as hereinafter described.

Figure 3:
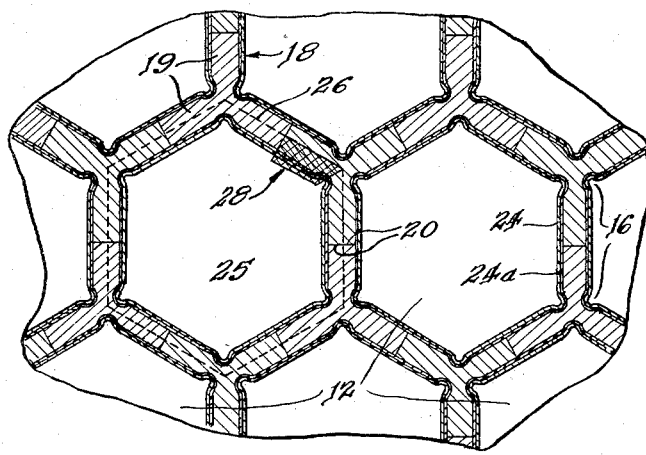
Fig. 3 is an enlarged sectional view taken from Fig. 1 showing the details of the coolant channels with the coolant tubes inserted therein.

The fuel block 10 is composed of Y-shaped longitudinally extending members 18 (Fig. 2) having radially extending portions 19. The members 18 are aligned with and abut one another along their outer longitudinal surfaces 20 to form the channels 12 as shown in Fig. 3. It will be noted that the members 18 may be described, with reference to Fig. 1, as formed by planes which are parallel to the faces 22 of the hexagonal fuel block 10. Each plane contains the axes of a row of channels 12 parallel to a face 22 of the block 10 and intersect the planes which are parallel to the other faces along each of the axes contained therein.

The described construction of the fuel block 10 facilitates the fabrication thereof by remote control procedures. The longitudinal members 18 may be formed by injection casting techniques using the apparatus and method described in the copending application of Arthur B. Shuck, Serial No. 689,459, filed October 10, 1957, now Patent No. 2,952,056. The reprocessed fuel material from the power breeder type reactor disclosed may be cast in glass molds into the longitudinal members which may, in turn, be easily assembled to form the fuel block by safe and efficient remote operations. It will be understood that the longitudinal members may be fabricated by other methods and means, such as extrusion or machining which are not as conducive to remote handling as those disclosed in the Shuck application. It will also be understood that the fuel block 10 may comprise longitudinal members having other than the Y-shaped configuration which will be hereinafter described.

Within each channel 12 in the fuel block 10 is a tube 24 essentially hexagonally shaped and adapted to pass coolant therethrough. The hexagonal tubes also have their corners enlarged and rounded as hereinafter described. The tubes 24 are manifolded at both ends of the fuel block 10 so that the coolant flow through all of the tubes in a block may be considered uniform. The reactor disclosed in the inventor's copending application utilizes sodium as the coolant so that the coolant tubes 24 are best fabricated from a corrosion-resistant material such as stainless steel.

Between each of the tubes 24 and the longitudinal elements 18 forming the channels 12 of the fuel block 10 is a layer of stagnant coolant 24a which forms a thermal bond between the fuel material and the tube 24 through which the flowing coolant passes. Sodium is used as the stagnant coolant in the reactor hereinbefore disclosed.

The longitudinal elements 18 and the hexagonal coolant tubes 24 are specially shaped so that the corners of the coolant channels 12 and the tubes 24 are enlarged and rounded. Their surfaces are contoured to facilitate the removal of heat from the central most portions of the longitudinal elements 18 wherein hot spots are most likely to occur.

The heat conditions which lead to the creation of the hot spots may best be understood with reference to Figs. 3, 4 and 5 showing enlarged portions of the fuel block 10. The analysis of the heat conditions is made with reference to a unit cell 25 which is represented by the dotted outline 26 around one of the channels 12 in Fig. 3. The dotted line 26 is located midway between adjacent channels through the extending portions 19 of the Y-shaped longitudinal elements 18 and would meet other such lines around adjacent channels at the central most point within the common longitudinal members 18 whereat the hot spots would occur. The dotted outline 26 represents the adiabatic boundary of the unit cell 25 across which no heat would flow, assuming that the heat generated in the fuel material and the longitudinal members is uniform throughout and the coolant flow through all coolant tubes 24 is uniform.

The crosshatched section in Fig. 3, referenced with the numeral 28, represents a thermally symmetrical portion of the fuel block 10 and is shown greatly enlarged in Figs. 4 and 5. Fig. 4 shows a thermally symmetrical portion 28 of a unit cell 25 wherein the channel and coolant tube corners are normal, whereas Fig. 5 illustrates a thermally symmetrical portion wherein the corners are enlarged and rounded. The upper edge 30 of each of the drawings in Figs. 4 and 5 coincides with the adiabatic boundary represented by the dotted outline 26 in Fig. 3. The vertex of the angle forming the upper right hand corner of the thermally symmetrical portion, referenced 32, represents the centermost point of the longitudinal member cross section at which point the hot spots would occur. The heat transfer surface between the fuel material of the longitudinal element 18 and the stagnant coolant layer 24a is represented at 34 and the transfer surface between the stagnant coolant 24a and the coolant tube is represented at 36. The lower edge 38 in each of the drawings represents the heat transfer surface between the coolant tube 24 and the coolant within the tube. The lines 39 in Figs. 4 and 5 represent the isothermals in the thermally symmetrical portion of the fuel block when it is in place in an operating nuclear reactor.

The isothermals 39 are labeled with respect to the temperature difference between the line and the flowing coolant. Thus the hottest spot has the maximum temperature difference ΔT max. and the other isothermals will have temperature differences a particular fraction of ΔT max.

It will be noted in Fig. 4 that the isothermal lines are somewhat flat and parallel to the transfer surface 38 in the tube portion 24 even though the corners thereof are not enlarged and rounded. However, the isothermal lines in the fuel block portion 18 are not parallel to one another, nor are they parallel to the adiabatic border 30 of the unit cell. It will be seen that the .875 ΔT max. line in fact crosses the adiabatic border 30 of the thermally symmetrical portion 28 and completely surrounds the maximum temperature point 32 when considered with the three unit cells which meet at the maximum temperature point.

Fig. 5 shows the effect on the isothermal lines when the channels 12 and the coolant tubes 24 have their corners enlarged and rounded. All of the isothermal lines approach parallelism with the adiabatic boundary 30 including the .875 ΔT max. line. Since the maximum temperatures are extended over a larger portion of the unit cell 28, a greater amount of heat energy may be extracted from each unit cell while operating at the same maximum temperature.

The applicant developed the particular contours for the disclosed reactor using a cut and try process with an electrical geometrical type analogue such as described in a technical report entitled, "Electrical Geometrical Analogue Techniques for the Solution of Two Directional Complex Heat Conduction Problems," by Wallace R. Simmons, report ANL-5319 dated September 1954. The technique makes use of the well-known analogy between thermal and electrical conductivity and involves the use of electrically conducting paper cut to the shape of a thermally symmetrical portion of the unit being analyzed. The thermal conductivity of the different parts (i.e., the fuel material, the stagnant coolant and the coolant tubes) is represented by varying numbers of layers of conducting paper. A voltage field is applied uniformly over that part of the paper representing the part of the unit wherein the heat is generated. The current flows through the portions representing fuel material, the stagnant coolant bond and the coolant tube to a common connection representing the flowing coolant. Voltage measurement between the common connection and different points on the conducting paper are analogous to temperature difference measurements between them and may be used to determine the isothermal lines shown in Figs. 4 and 5.

To establish the best configuration consistent with reasonable fabrication techniques a cut and try process was used in which a configuration was assumed and tried. Changes were made until the maximum condition was reached while maintaining the corners of the coolant tube at a radius which may be easily formed.

The contours of the curved transfer surfaces 34, 36 and 38, shown in Fig. 5, were developed for a fuel element for use with the reactor disclosed in the inventor's co-application referenced above, wherein, the fuel material in the longitudinal member 18 is a fissium alloy, the stagnant coolant 24a is sodium, the coolant tube 24 is stainless steel and the flowing coolant is sodium. The contours are dependent upon the materials used in the assembly and to some extent the flow rate of the coolant, bearing in mind the fabrication techniques which must be used in shaping the coolant tubes and the members 18 making up the fuel block.

For a reactor of the type described, the fuel block is made up of longitudinal elements, each 14.22" long and measuring .041" in width across the radially extending portions 19 so that the center-to-center distance between adjacent channels is 0.227". Each of the stainless steel coolant tubes 24 is .008" thick while the sodium layer 24a has a minimum thickness of .003".

The contours of the heat transfer surfaces 34, 36 and 38 may best be described by the radii of the curves making up the contours as shown in Fig. 5. The radii A, B and C measure .035", .038" and .046", respectively, and dimension D locating the common center for the radii from the maximum temperature point 32 measures .040". Radius E is .010" and extends from a center located .023" from the maximum temperature point on the line 39 forming the right side of the thermally symmetrical portion shown in Fig. 5. The radii F and G for the coolant tube 24 are .010" and .002", respectively, and extend from a point located .300" from point 32.

It will be understood that other methods may be used for determining the optimum contours for the corners such as by mathematical solution using finite difference calculations. The method used herein and described in the aforementioned technical report does not form a part of the applicant's invention and is not claimed herein.

Figure 6:
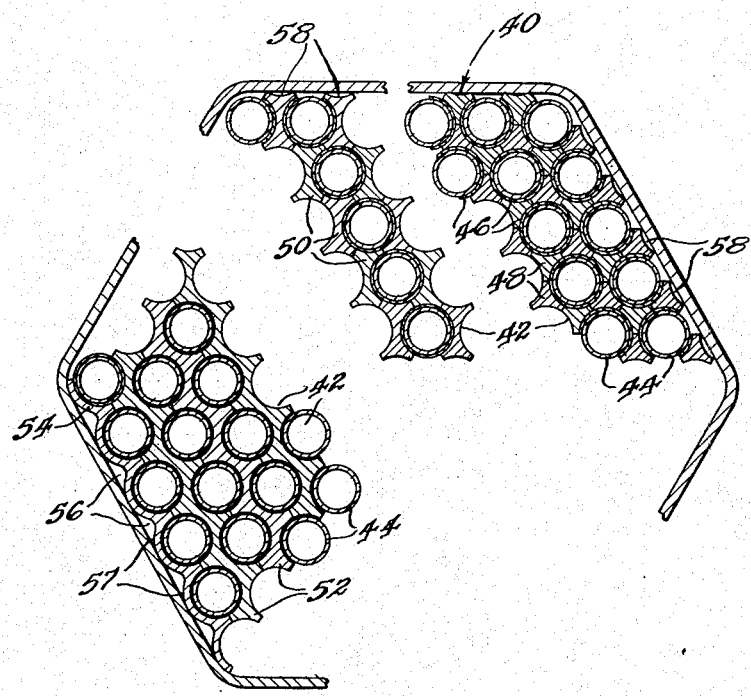
Fig. 6 is a sectional view of another fuel element showing other embodiments of the claimed invention.

It is to be understood that certain of the inventive features described hereinbefore would not be necessarily confined to a radiator fuel block having hexagonal shaped channels and tubes therein. In Fig. 6 is shown a fuel element or block 40 having circular channels 42 longitudinally extending therethrough. The channels 42 are arranged in a hexagonal lattice and are in rows parallel to the sides of the hexagonally shaped fuel block 40. Within the channels 42 are coolant tubes 44 which are thermally bonded to the fuel block 40 by means of a stagnant coolant layer 46 therebetween.

As seen in the upper right hand portion of Fig. 6, the fuel block may be made up of longitudinally extending members 48 which are described by planes parallel to the nonparallel sides of the fuel block, each of said planes containing the axes of the coolant channels parallel to the sides thereof. These members 48 are similar to the Y-shaped members 18 for the fuel block 10 previously described except that they describe circular channels when assembled together.

In the upper left hand portion of Fig. 6, it is shown that the fuel block may be made up of longitudinal members 50 which have a different shape than heretofore described. These members are formed by planes which run parallel to two nonparallel sides of the fuel block, said planes containing the axes of the channels in the rows of channels parallel to said sides. These members 50 may also be made by casting techniques, but are not as readily adaptable to be fabricated by the techniques of the referenced copending Shuck reference.

In the lower left portion of Fig. 6 is a third configuration for the longitudinal members and is designated 52 therein. These members are more or less plate-shaped in that they are described by planes parallel to each other and parallel to only one side of the hexagonally shaped fuel block 40. The planes contain the axes of the coolant channels in the rows parallel to that side of the fuel block. Additional members 54 are then required around the periphery of the fuel block to complete the outside rows of channels.

It will be noted that the periphery of the fuel block formed by the additional members 54 has indentations 56 formed of the surfaces 57 conforming concentrically to the circular cross section of the adjacent channels in the outer row. Stagnant coolant is disposed in the indentations and aids to remove the hot spots which would occur in those portions of the fuel block since coolant flows only on one side at those portions. Further, the stagnant coolant provides a path for heat flow to the periphery of the hexagonal tube sheath and permits the thickness of the additional member 54 to be greater than one-half the thickness of the portions between centrally located adjacent channels 42. It will be seen that these indentations are also present at 58 in the two other configurations shown in Fig. 6 and described above. The fuel block 10 described with reference to Fig. 1 also has the indentations around the periphery as shown at 60 therein.

It is also contemplated that the fuel blocks of a type described having circular channels or hexagonal channels with enlarged corners and having indentations around its periphery may be formed of plate or wafer type members which are stacked together with coolant tubes extending through the aligned coolant channels. The wafers (not shown) may be fabricated by powder metallurgy process and may have circular, hexagonal or other shaped apertures to form the coolant channels.

While a number of embodiments of applicant's invention have been illustrated and described, it is his intention not to be bound thereby but to be limited only by the scope of the appending claims.

What is claimed is:

1. A radiator type fuel block assembly comprising a cylinder of neutron fissionable material having a hexagonal transverse cross-sectional shape, a plurality of longitudinal equally spaced channels therein aligned in rows parallel to each face of said cylinder, each of said channels being hexagonally shaped with the corners rounded and enlarged and having a maximum temperature isothermal line surrounding each channel which is approximately straight and equidistant between adjacent channels, a tube adapted to convey coolant and shaped to conform to the cross-sectional shape of said channel disposed concentrically in each of said channels, stagnant coolant in each of said channels between said tubes and said cylinder, the periphery of the cylinder having indentations formed of surfaces conforming concentrically to the cross sections of adjacent outermost coolant channels.

2. A radiator type fuel block assembly comprising a cylinder of neutron fissionable material having a hexagonal transverse cross-sectional shape, a plurality of longitudinal, equal-spaced, coolant channels therein aligned in rows parallel to each face of said cylinder, each of said coolant channels being hexagonally shaped with the corners rounded and enlarged and having a maximum temperature isothermal line around each channel which is approximately straight and equidistant between adjacent channels.

3. The fuel block assembly of claim 2 comprising a tube adapted to convey coolant and shaped to conform to the cross sectional shape of said channels, concentrically disposed within each of said channels, and stagnant coolant in said channels between the tubes and said cylinder.

4. A radiator type fuel block assembly as described in claim 2 wherein said cylinder comprises a plurality of stacked wafers having apertures therein forming said channels.

5. A radiator type fuel block assembly as described in claim 2 wherein said cylinder comprises a plurality of longitudinal members described by intersecting planes parallel to two nonparallel faces of said hexagonal cylinder, each plane containing the axes of channels forming a row parallel to one of said faces.

6. A radiator type fuel assembly essentially as described in claim 2 wherein said cylinder comprises a plurality of longitudinal members described by intersecting planes parallel to three nonparallel faces of said hexagonal cylinder, each plane containing the axes of channels forming a row parallel to one of said faces.

References Cited in the file of this patent
UNITED STATES PATENTS

| | | |
|---|---|---|
| 2,780,596 | Anderson | Feb. 5, 1957 |
| 2,870,076 | Koch | Jan. 20, 1959 |

OTHER REFERENCES

BMI–959, Oct. 22, 1954. Available from TIS, Industrial Reports Section, P.O. Box 1001, Oak Ridge, Tenn. Price 25 cents. (Copy in Library.)

BMI–983, Feb. 21, 1955. Available from TIS, Industrial Reports Section, P.O. Box 1001, Oak Ridge, Tenn. Price 30 cents. (Copy in Library.)

International Conference on the Peaceful Uses of Atomic Energy, 1955, vol. 9, page 182. (Copy in Library.)